I. C. WOODWARD.
LOCK NUT.
APPLICATION FILED MAR. 25, 1914.

1,137,941.

Patented May 4, 1915.

WITNESSES
M. H. Klandt.
Walter F. Stone

INVENTOR
Irving C. Woodward
BY Rummler & Rummler
ATTYS.

UNITED STATES PATENT OFFICE.

IRVING C. WOODWARD, OF CHICAGO, ILLINOIS.

LOCK-NUT.

1,137,941.     Specification of Letters Patent.     Patented May 4, 1915.

Application filed March 25, 1914. Serial No. 827,075.

*To all whom it may concern:*

Be it known that I, IRVING C. WOODWARD, a citizen of the United States of America, and a resident of Chicago, county of Cook, and State of Illinois, have invented certain new and useful Improvements in Lock-Nuts, of which the following is a specification.

The main objects of this invention are to provide an improved form of lock nut wherein the threads are coated with material adapted and arranged to cause the nut to grip the threads of the bolt so as to effectively prevent the nut from accidentally backing off or becoming loosened through being jarred and strained in service; and to provide an improved simple and inexpensive method of applying the coating material to the nut.

An illustrative embodiment of this invention is shown in the accompanying drawings, in which—

Figure 1:
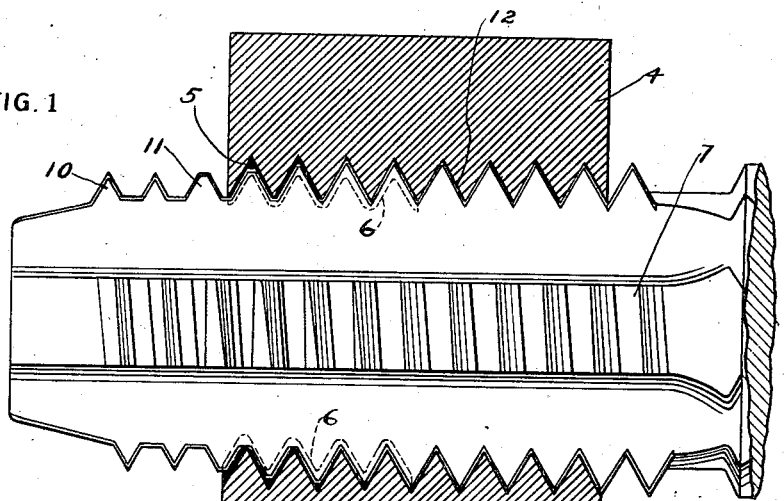
Figure 3:
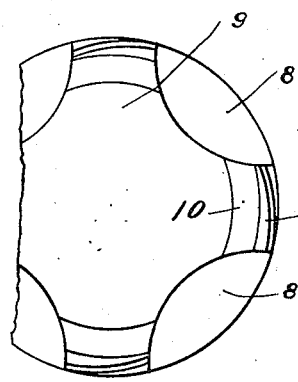
Figure 2:
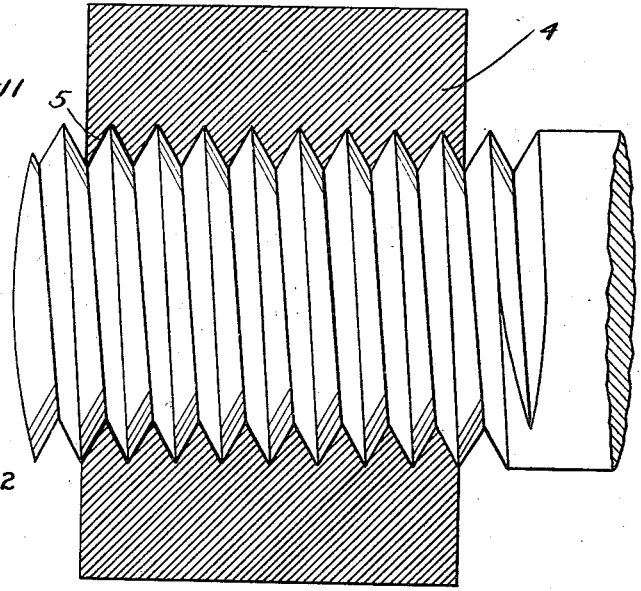

Figure 1 is a sectional view of a nut with threads suitably coated with material in accordance with this invention and showing also a suitable form of threading tap for shaping the coated threads so as to accomplish the desired results. Fig. 2 is a sectional view of the lock nut in position on a bolt. Fig. 3 is an end view of the special threading tap shown in Fig. 1.

The nut 4 may be of any suitable design with threads cut therein in the usual manner, and with threads of substantially uniform shape throughout. After the threading of the nut has been completed, its threads are coated with suitable material applied in such manner as to make the nut grip the threads of the bolt upon which it is screwed. For example, the nut may be dipped into a molten soft metal, such as zinc, to a suitable depth, say about half the thickness of the nut. The molten metal adheres to the nut and forms a coating 5 on the threads, somewhat as indicated by the dotted lines 6, Fig. 1. A threading tap 7 is then run through the nut 4 so as to cut away the surplus part of the zinc coating 5 and leave a tapering layer thereof on two or more of the outermost convolutions of the threads.

The threading tap 7 is preferably of special design, being formed with the usual axially disposed grooves 8 and ridges 9, but the first two convolutions 10 of the threads at the end of the tap 7 are of triangular cross section and of the same pitch as the other threads but of smaller diameter. On engaging the coating 5 the threads 10 score the coating in the thread grooves of the nut so as to facilitate the cutting which is done by the next three or four threads 11. The threads 11 are successively and gradually increased in diameter up to the full diameter of the threads 12 on the body of the tap. Thus as the tap 7 is driven through the nut 4, the coating 5 is gradually shaved off until there remains only a tapering layer on the outermost threads, this being thickest at the outer end of the nut and tapering to nothing at a point some distance from the inner end of the nut, say midway between the ends.

When the finished lock nut 4 is screwed onto a bolt, it turns easily until the end of the bolt reaches the coating 5 of soft metal, whereupon more and more resistance is encountered as the bolt cuts and forces its way through the gradually thickening layer of the coating. Thus when the nut is screwed home upon the bolt the coating fills the entire spaces between adjacent threads of the nut and bolt and locks the nut so securely that it cannot be accidentally jarred loose or backed off, although it may be readily removed by the use of a wrench.

I am aware that a construction has been previously proposed wherein a layer of soft metal is interposed between the threads of a nut and bolt, but in such case the relative diameters of the nut and bolt were necessarily different than those of standard form to make room for the soft metal and the holding power consequently was no greater than the shearing strength of the soft metal, rendering the nuts impractical for resisting vibration and steady strain. The present invention is distinctly different in that it employs merely a coating applied in a peculiar manner to nuts and bolts which are both of standard form and capable of bearing all of the load that can be borne by standard nuts and bolts.

I claim:

1. As an article of manufacture, a standard nut threaded to fit its bolt and having its threads adjacent to one end only coated with material adapted to frictionally grip the bolt and secure the nut thereon.

2. As an article of manufacture, a standard nut threaded to fit a standard bolt and having a packing of softer metal embedded in a portion only of the thread grooves whereby, when said nut is screwed onto its bolt, the threads of the bolt will be forced to cut into said soft metal coating and bind said nut on the bolt.

3. As an article of manufacture, a standard nut having one or more convolutions of the threads adjacent to one end only thereof coated with a tapered layer of soft metal whereby, when said nut is screwed onto a bolt, the threads will be forced to cut into said soft metal coating and bind said nut on the bolt.

Signed at Chicago this 23d day of March 1914.

IRVING C. WOODWARD.

Witnesses:
EUGENE A. RUMMLER,
M. IRENE HUTCHINGS.